United States Patent Office 3,743,524
Patented July 3, 1973

3,743,524
REFRACTORY MASS
Lennart Andersson, Saltsjö-Boo, Sweden, assignor to Strabruken AB, Villagatan, Stockholm, Sweden
No Drawing. Filed July 26, 1971, Ser. No. 166,263
Claims priority, application Sweden, Aug. 3, 1970, 10,633
Int. Cl. C04b 35/04, 35/06
U.S. Cl. 106—58                                  6 Claims

ABSTRACT OF THE DISCLOSURE

A refractory ceramic mass which is mixable with water, consisting of a graded mixture of grains of one or more refractory materials, characterized in that at least a portion of the finest fractions having a maximum grain size of about 0.1 mm. consists of burnt dolomite and that there is included in the mixture a water soluble hydration retarding agent (such as powdered natrium silico fluoride) which prevents or sufficiently retards a reaction between the finest grains of burnt dolomite and the added water.

---

From the time at the end of the 1870's, when the Thomas process for refining pig iron to steel was invented, and on to our days burnt dolomite has been widely used within the metallurgical industry as basic refractory material. One reason for this extensive use is the fact that the mineral dolomite, $MgCa(CO_3)_2$, is found in most steel producing countries, so that burnt refractory dolomite, $MgO \cdot CaO$, could be produced at comparatively low costs near the users. An inconvenience found in burnt dolomite is that the CaO-portion readily reacts with water, even with the normal moisture found in the atmosphere resulting in the formation of calcium hydroxide $Ca(OH)_2$. In connection with the hydration an increase of volume takes place, wherefore the attack of water or of the moisture present in the air results in a swelling and in a mechanical disintegration of the individual dolomite grains.

In order to reduce as far as possible the susceptibility of the burnt dolomite to react with water, the burning is as a rule effected at as high a temperature as is practically possible, so that a so-called dead-burnt product is obtained, but also in such a product the susceptibility of reaction is so great that regard thereto must be taken in all industrial applications.

It has also been proposed to reduce the susceptibility of the burnt dolomite to react with water by effecting the burning together with silicon dioxide or other hydration retarding agents which during the burning operation react chemically with the dolomite so that as a result a so-called stabilized burnt dolomite is obtained. The stabilized burnt dolomite is less susceptible to reaction with water than ordinary burnt dolomite but it has as a rule less favourable refractory properties than the latter.

When using the refractory mass for the production of bricks or blocks, or when applying the mass as a layer on a backing, one starts as a rule from crushed and graded burnt dolomite which, in order to secure a sufficiently compact end product, contains a very fine fraction having a grain size less than about 0.25 mm. It is in the first instance the finest fractions which on account of their comparatively large active surface are particularly susceptible of reaction and which, therefore, must be protected against the action of water and moisture. According to a known method the crushed and graded material is mixed for that purpose with coal tar which not only gives the pressed or stamped products the necessary mechanical cohesion but also protects the dolomite grains against attacks from the air moisture after the formation. According to another known method bricks of crushed dolomite are pressed, either in dry condition or with a small addition of oil, are then burnt in a funnel furnace at a high temperature and are impregnated, after completion of the burning operation, with tar which serves as protection against attacks from the moisture present in the air.

Such known methods in refractory technology, in which water or water containing materials are used, e.g. in connection with shaping, casting or spraying operations, could hitherto not be used when the finest fractions of the granular refractory material consisted of burnt dolomite. It is an object of the invention to render such an application possible. According to the invention said object has been attained by adding to the granular refractory mass, the dolomite content of which has preferably been burnt in ordinary manner in the absence of hydration retarding agents, a water soluble hydration preventing or retarding agent. Particularly suitable is an addition of fluorides, e.g. natrium fluoride, potassium fluoride or ammonium fluoride. Also complex fluorides, such as natrium silico fluoride and magnesium silico fluoride, have been found to be active although in a less degree than the first mentioned agents. The amount of the said hydration retarding additions can be 1 à 2%. The plastic mass obtained when mixing the dry refractory mass with water must contain in known manner a water soluble binding agent, e.g. silicate of potassium. Preferably, the said binding agent has been admixed in the dry ceramic mass in powder form. In the selection of binding agents and hydration retarding agents regard must be taken to the effect of said agents on the burnt dolomite at high temperatures.

The invention shall now be described more closely with reference to a number of practical examples.

EXAMPLE 1

A mass according to the invention, which is particularly suitable for repairing the lining of e.g. an electric furnace for the production of steel, may be produced in the following manner.

The burnt dolomite is first crushed in a hammer crusher or cone crusher and divided into grades or fractions. 40–50 parts of a fraction having a grain size of 0–0.25 mm. are mixed with 50–60 parts of a fraction having a grain size of 0.25–2.5 mm. During the mixing operation are added 3–5 parts of powdered silicate of natrium as a binding agent, and 0.5–2 parts of powdered natrium silico fluoride as a hydration preventing or retarding agent.

The repair of the lining may be carried out during the short time interval between the tapping of the furnace and the next charging. The dry refractory mass is introduced into the furnace in the desired position by means of compressed air through a long tubular nozzle and simultaneously water which mixes with the refractory material is blown onto the surface in an amount which gives the material such a consistency that a compact layer is formed at the desired position in the furnace. The binding agent and the hydration retarding agent rapidly dissolves in the water. On account of the high temperature of the furnace the layer of moist refractory material dries up very rapidly, and thereafter the binding agent starts to bind chemically. The chemical binding gives the applied material sufficient mechanical strength until later on the material is sintered onto the furnace wall at the operating temperature of the furnace. The hydration retarding agent prevents chemical reaction between the fine grains in the refractory mass and the water mixed thereinto during the short period of time elapsing until the mass has dried.

A sprayable mass having the above composition, in which not only the finest fractions but also the coarser fractions consist of burnt dolomite, may be used to particular advantage when it is desired to repair a furnace lining consisting solely of burnt dolomite, in that in such a case the sprayed mass will have the same physical and chemical properties as the backing, whereby the adherence of the sprayed-on mass is improved and the strength is increased.

EXAMPLE 2

Burnt dolomite is crushed in a hammer crusher or cone crusher and graded or divided into fractions. The following fractions are mixed in the relative amounts stated:

25 parts of fraction 1.0–2.5 mm.
35 parts of fraction 0.25–1.0 mm.
40 parts of fraction 0–0.25 mm.

To 100 parts of the dolomite mass are, during the mixing operation, added 3 parts of a binding agent in the form of powdered silicate of potassium as binding agent and 1 part of powdered natrium fluoride as hydration retarding or preventing agent.

EXAMPLE 3

Burnt dolomite is crushed in a hammer crusher or cone crusher to 2.5 mm. maximum grain size. A portion of the crushed dolomite is ground in a ball mill to about 0.1 mm. maximum grain size. About 85 parts of a fraction having a grain size of 0–2.5 mm. obtained in the hammer crusher or cone crusher is mixed with about 15 parts of a fraction having 0.01 mm. grain size obtained in the ball mill. During the mixing operation there is added to 100 parts of burnt dolomite 3 parts of powdered silicate of potassium as a binding agent and 1 part of powdered natrium silico fluoride as a hydration preventing or retarding agent.

EXAMPLE 4

A mixture consisting of about 70 parts of burnt dolomite and about 30 parts of burnt magnesite is crushed in a hammer crusher or cone crusher to about 2.5 mm. maximum grain size. A portion of the crushed mixture is ground in a ball mill to about 0.1 mm. maximum grain size. About 85 parts of the fraction having a maximum grain size of 0–2.5 mm. are mixed with about 15 parts of the fraction having a grain size of 0–0.1 mm. In connection with the mixing operation there is added to 100 parts of the refractory mass 3 parts of a binding agent in the form of powdered silicate of potassium and 1 part of powdered natrium silico fluoride as a hydration preventing or retarding agent. The proportion between burnt dolomite and burnt magnesite contained in the mixture may be varied as desired.

The refractory masses according to the invention may be used mixed with water also for the production of blocks or bricks and for the production of whole furnace linings, the hydration retarding agent then preventing the non-desired reaction between the finest dolomite grains and the water.

Obviously, it is not necessary to include the water soluble binding agent already in the dry ceramic mass but the binding agent may, when considered advantageous, be added to the mass only in connection with the mixing of the mass with water, A correct percentage of a binding agent is obtainable with a higher degree of security, however, if the binding agent in dry condition forms part of the graded ceramic mass. When manufacturing refractory bricks or blocks on a large scale in a factory it should be possible, from a theoretical point of view, to introduce also the hydration retarding agent with the water in connection with the mixing of water into the graded ceramic mass, but for practical reasons this is generally not suitable, in that also when manufacturing bricks of dolomite in a fractory it is difficult to avoid comparatively long storing periods for the crushed and graded dolomite during which the moisture present in the air may react with the finer grains of dolomite.

What I claim is:

1. A basic refractory cerramic mass which is mixable with water, consisting essentially of a graded mixture of a basic refractory material selected from the group consisting of burnt dolomite and burnt magnesite and comprising a finest fraction having a maximum grain size of about 0.1 mm., characterized in that at least a portion of the finest fraction consists of burnt dolomite and that there is included in the mixture a water soluble fluoride which prevents or sufficiently retards a hydration reaction between the grains of dolomite and the added water.

2. A ceramic mass as set forth in claim 1, characterized in that the finest fraction consists exclusively of burnt dolomite.

3. A ceramic mass as set forth in claim 2, characterized in that all fractions consist of burnt dolomite.

4. A ceramic mass as set forth in claim 1, characterized in that the water soluble fluoride constitutes about 1–3% of the mass.

5. A ceramic mass as set forth in claim 2 wherein the water soluble fluoride constitutes about 1–3% of the mass.

6. A ceramic mass as set forth in claim 3 wherein the water soluble fluoride constitutes about 1–3% of the mass.

References Cited

UNITED STATES PATENTS

| | | | |
|---|---|---|---|
| 3,330,890 | 7/1967 | Holt et al. | 106—61 |
| 3,497,581 | 2/1970 | Wuhrer et al. | 106—61 |
| 2,323,029 | 6/1943 | Goodrich | 106—84 |
| 3,138,471 | 6/1964 | Wygant | 106—84 |
| 3,490,931 | 1/1970 | Petkus | 106—84 |

JAMES E. POER, Primary Examiner

U.S. Cl. X.R.

106—61, 63